(12) United States Patent
Nakajima et al.

(10) Patent No.: US 7,750,607 B2
(45) Date of Patent: Jul. 6, 2010

(54) AUXILIARY ELECTRIC POWER SUPPLY FOR VEHICLE AND CHARGER/DISCHARGER FOR VEHICLE

(75) Inventors: Norio Nakajima, Kyoto (JP); Susumu Nisimoto, Nara (JP); Yoshio Mizutani, Osaka (JP)

(73) Assignee: Panasonic Corporation, Osaka (JP)

( * ) Notice: Subject to any disclaimer, the term of this patent is extended or adjusted under 35 U.S.C. 154(b) by 369 days.

(21) Appl. No.: 11/914,880

(22) PCT Filed: Jul. 31, 2006

(86) PCT No.: PCT/JP2006/315106

§ 371 (c)(1),
(2), (4) Date: Nov. 19, 2007

(87) PCT Pub. No.: WO2007/026495

PCT Pub. Date: Mar. 8, 2007

(65) Prior Publication Data

US 2009/0058371 A1    Mar. 5, 2009

(30) Foreign Application Priority Data

Aug. 31, 2005  (JP)  ............................. 2005-251159
Aug. 31, 2005  (JP)  ............................. 2005-251160

(51) Int. Cl.
*H02J 7/00*  (2006.01)
(52) U.S. Cl. ..................................... 320/167; 320/136
(58) Field of Classification Search .................. 320/135, 320/136, 167
See application file for complete search history.

(56) References Cited

U.S. PATENT DOCUMENTS

| 5,155,374 | A | | 10/1992 | Shirata et al. |
| 5,528,121 | A | * | 6/1996 | Okamura ..................... 320/167 |
| 2004/0246635 | A1 | | 12/2004 | Morita |
| 2008/0278117 | A1 | * | 11/2008 | Tarchinski .................. 320/135 |

FOREIGN PATENT DOCUMENTS

GB          758069          9/1956

(Continued)

OTHER PUBLICATIONS

International Search Report for PCT/JP2006/315106, dated Aug. 22, 2006.

(Continued)

*Primary Examiner*—Edward Tso
*Assistant Examiner*—Richard V Muralidar
(74) *Attorney, Agent, or Firm*—RatnerPrestia

(57) ABSTRACT

The auxiliary electric power supply for a vehicle has a first switch electrically connected to an I/O end; a capacitor bank; a discharge resistance; and a controller. The capacitor bank has series-connected electric double layer capacitors, and balanced resistances. Each of the balanced resistance is parallel-connected to each electric double layer capacitor, and has substantively the same resistance value. The capacitor bank and discharge resistance are connected to the first switch. The controller controls the first switch while monitoring the voltage of the capacitor bank and the operating state of the ignition key operating the ignition switch of the vehicle, so as to connect the capacitor bank to the discharge resistance when the ignition switch is turned off.

8 Claims, 3 Drawing Sheets

FOREIGN PATENT DOCUMENTS

| | | |
|---|---|---|
| JP | 2-259276 A | 10/1990 |
| JP | 5-23527 U | 3/1993 |
| JP | 10-201091 | 7/1998 |
| JP | 10-201091 A | 7/1998 |
| JP | 11-122709 A | 4/1999 |
| JP | 2003-244859 A | 8/2003 |
| JP | 2004-222438 A | 8/2004 |
| JP | 2004-303518 A | 10/2004 |
| JP | 2004-322987 A | 11/2004 |

OTHER PUBLICATIONS

Supplementary European Search Report for Application No. EP 06 78 1984, Aug. 6, 2009, Panasonic Corporaiton.

* cited by examiner

AUXILIARY ELECTRIC POWER SUPPLY FOR VEHICLE AND CHARGER/DISCHARGER FOR VEHICLE This application is a U.S. National Phase Application of PCT International Application PCT/JP2006/315106.

TECHNICAL FIELD

The present invention relates to an auxiliary electric power supply for a vehicle, having electric double layer capacitors and charged and discharged in conjunction with such as a lead storage battery, to be mounted on an automobile, and to a charger/discharger for a vehicle including the power supply.

BACKGROUND ART

In recent years, technological innovation in automobiles has been outstanding responding to the trend of protection of the earth environment. As a part of the technology, hybrid cars are already commercially available. Further, an automobile with stop-idling function, which temporarily stops the engine under certain conditions and automatically restarts the engine, has been developed and sold in the market.

Restarting the engine of such an automobile with stop-idling function requires a large current, thus causing the voltage of the in-vehicle power supply to be momentarily lowered. This phenomenon may cause an in-car device such as a car navigation system controlled by a microprocessor to be automatically reset. When the in-car device automatically restarts, the user needs to reset his/her desired settings. To solve the problem, the suggestion is made that a backup circuit including a battery or electric double layer capacitors be mounted on an automobile, which is already available in the market.

An electric double layer capacitor is a key component supporting the technology. The capacitor is generally used in conjunction with a lead storage battery (referred to as "battery" hereinafter) which is conventionally used. As a method of charging an electric double layer capacitor, using braking energy is proposed in Japanese Patent Unexamined Publication No. H11-122709, for example.

Meanwhile, Japanese Patent Unexamined Publication No. H02-259276 proposes that electric double layer capacitors be series-connected to the battery, and the starter be driven by them to start the engine, thereby reducing the load to prolong the battery life.

However, in a conventional engine starter, electric charge charged while the vehicle is operating remains unchanged in the electric double layer capacitors while the vehicle is non-operating. A non-operating state continuing in such circumstances places a heavy load on the capacitors, thereby causing the life to be shortened. From such a viewpoint, electric charge charged in the capacitors is preferably discharged while the vehicle is non-operating. Meanwhile, restarting after stopping idling requires a current of tens of amperes at approximately 12 V. Consequently, when discharging the capacitors as described above, frequent restarting places a heavy load on the lead storage battery to impair the effect of using electric double layer capacitors, resulting in significantly decreasing the battery life.

As a method of charging plural series-connected electric double layer capacitors, "balanced circuit method" has been employed conventionally. In this method, balance resistances R101, R102, R103, Rn with the same resistance value are parallel-connected to electric double layer capacitors C101, C102, C103, Cn, respectively, as shown in FIG. 3. This arrangement causes the bias voltage to each capacitor to be balanced, thereby applying substantially the same voltage to each capacitor.

In this balanced circuit method, the balance resistance is always connected to each electric double layer capacitor. The entire electric circuit thus forms a closed loop, and as a result, electric energy accumulated in each capacitor is gradually lost due to discharge. Accordingly, the balance resistance needs to be parallel-connected and disconnected to and from an electric double layer capacitor using such as a transistor. However, if discharge by the balance resistance is completely suppressed, a heavy load is placed on the capacitors, resulting in shortening the life.

When using a car navigation system or watching TV while the ignition power is off and only the accessory power is on after the engine stops, their operating current is supplied from the battery. Even if the automobile is in a complete stop, a dark current is always supplied to the receiving unit of a remote controller for locking and unlocking, a clock, and other devices. All of the dark currents are supplied from the battery. Consequently, the voltage of the battery is gradually lowered. The voltage deficiency is compensated for by electric energy accumulated in the electric double layer capacitors, thereby the voltage of the capacitors is gradually lowered as well. If both voltages of the battery and capacitors drop, starting the engine becomes difficult.

SUMMARY OF THE INVENTION

The present invention provides an auxiliary electric power supply for a vehicle that reduces a load on the electric double layer capacitors and battery to prolong their lives and that is unlikely to place a load due to a dark current on the capacitors; and a charger/discharger for a vehicle including the power supply. The power supply of the present invention has a first switch electrically connected to an input/output end (I/O end), a capacitor bank, a discharge resistance, and a controller. The capacitor bank has series-connected electric double layer capacitors, and balanced resistances parallel-connected to each capacitor with substantively the same resistance value. The capacitor bank and the discharge resistance are connected to the first switch. The controller controls the first switch while monitoring the voltage of the capacitor bank and the operating state of the ignition key for operating the ignition switch of the vehicle. The controller controls the first switch so as to connect the capacitor bank to the discharge resistance when the ignition switch is turned off. The controller thus makes the capacitor bank discharged to decrease the voltage of the capacitor bank to a first voltage, at which the life of the capacitors is not shortened. In the auxiliary electric power supply for a vehicle according to the present invention, the controller controls the first switch to control charge and discharge of the capacitors, thereby reducing a load on the capacitors and battery to prolong their lives.

DETAILED DESCRIPTION OF PREFERRED EMBODIMENTS

First Exemplary Embodiment

Figure 1:
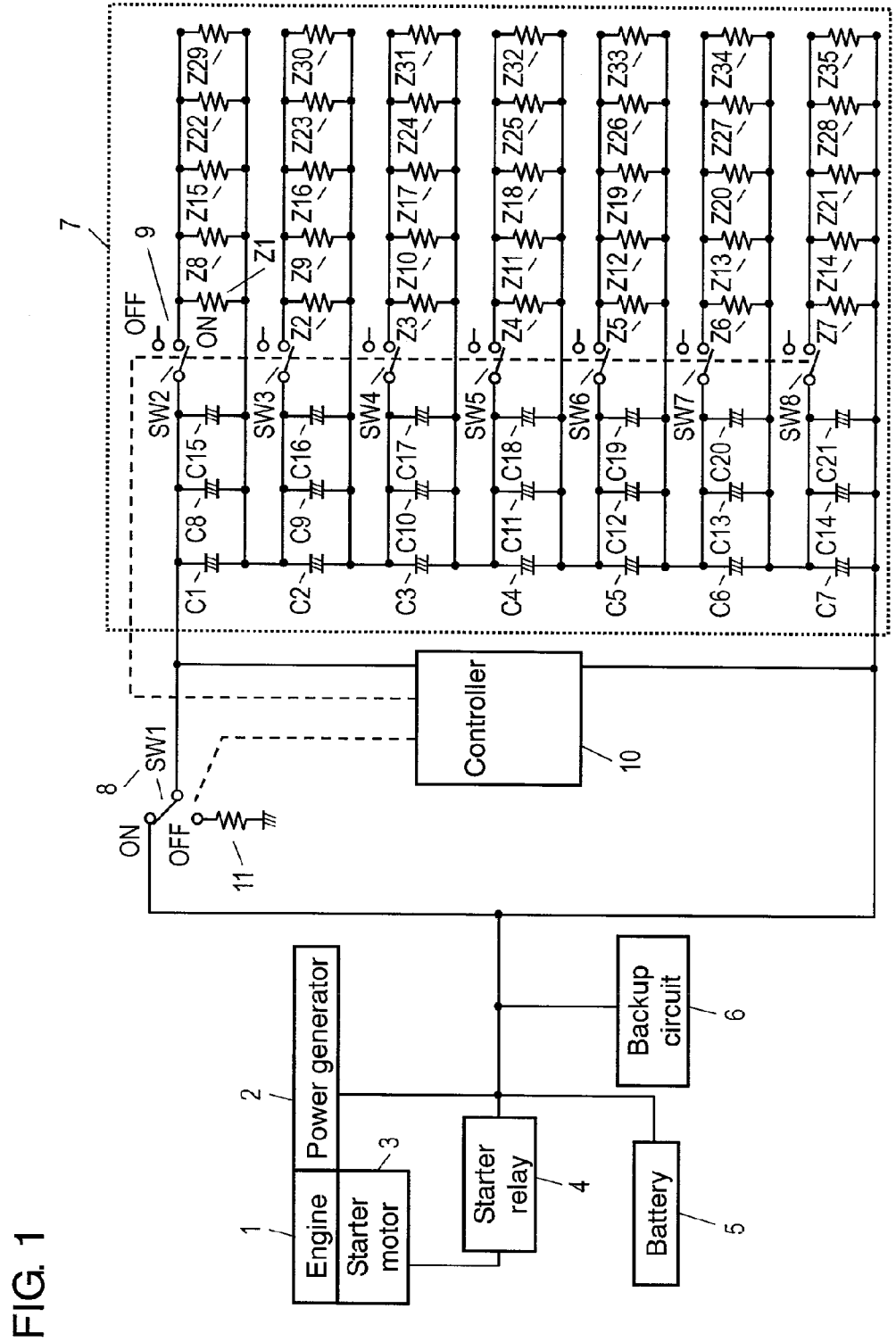
FIG. 1 is a block diagram illustrating makeup of a charger/discharger for a vehicle, according to a first exemplary embodiment of the present invention, in conjunction with a circuit diagram.

FIG. 1 is a block diagram illustrating makeup of a charger/discharger for a vehicle, according to the first exemplary embodiment of the present invention, in conjunction with a circuit diagram. The charger/discharger according to the present embodiment has power generator 2, battery 5, and an auxiliary electric power supply for a vehicle including capacitor bank 7, first switch 8, and controller 10.

Power generator 2 is driven in conjunction with engine 1. Starter motor 3 starts engine 1. Battery 5 generally formed of a lead storage battery supplies starter motor 3 with power through starter relay 4. Backup circuit 6 supplies starter motor 3 with backup energy in an emergency through starter relay 4. Capacitor bank 7 is formed of electric double layer capacitors interlinked.

First switch 8 is electrically connected to the I/O end of capacitor bank 7. Capacitor bank 7 is connected to power generator 2, starter relay 4, battery 5, and backup circuit 6 through first switch 8. The operation of first switch 8 switches the connection from capacitor bank 7 between the I/O end linking to battery 5 and starter relay 4; and discharge resistance 11. First switch 8 may be of any method as long as it functions as a switch. A mechanical switch or semiconductor switch may be used, for example.

Capacitor bank 7 is formed of 21 electric double layer capacitors C1 through C21 into 3 units parallel-connected, where one unit is composed of 7 series-connected electric double layer capacitors. In other words, each 7 capacitors, indicated with C1 through C7, C8 through C14, and C15 through C21, are respectively series-connected to form a 14 V unit, and these series units are parallel-connected. In other words, each 3 capacitors (e.g. C1, C8, C15) are parallel-connected to form 7 parallel units, and the 7 parallel units are series-connected.

Electric double layer capacitors C1 through C21 are formed as the following for example. First, lead wires are connected to an etched aluminum foil with a thickness of 20 μm to 50 μm. Meanwhile, a paste is prepared with a mixed powder of activated carbon powder, a given binder and conductive agent; and a dispersion medium. The paste is applied onto the above-described aluminum foil to form a conductive layer, and then an activated carbon layer primarily containing activated carbon is formed thereon. Through this process, polarizable electrodes are formed. A pair of the electrodes thus produced is wound facing each other with a separator intervening therebetween to form a capacitor element. After being impregnated with an electrolyte, the capacitor element is inserted into an aluminum case, and then the opening of the aluminum case is sealed. With the above-mentioned processes, electric double layer capacitors C1 through C21 are formed.

The withstand voltage of electric double layer capacitors C1 through C21 is determined by the type of their electrolyte. This withstand voltage determines the rated voltage of the electric double layer capacitors. For an electrolyte with an aprotic solvent such as propylene carbonate, the rated voltage of one electric double layer capacitor usually ranges between 2 V and 3 V.

Each 5 of balanced resistances Z1 through Z35 with the same resistance value are parallel-connected to each 7 electric double layer capacitors where 3 units made of 7 electric double layer capacitors series-connected. In other words, 5 balanced resistances are parallel-connected to each parallel unit, where each parallel unit is composed of 3 capacitors parallel-connected. Here, the type of balanced resistances Z1 through Z35 is not particularly limited. Chip-type or lead-wire-type resistances may be used.

Capacitor bank 7 includes second switches 9. Second switches 9 are provided between each 7 electric double layer capacitors, where the 3 units of the 7 electric double layer capacitors are parallel-connected, and 5 balanced resistances parallel-connected to the each 7 electric double layer capacitors. Although a total of 7 switches are provided between the electric double layer capacitors and balanced resistances, the switches are called second switch 9 collectively for convenience and operate simultaneously. Second switch 9, as well as first switch 8, may be of any method as long as it functions as a switch.

Controller 10 controls first switch 8 and second switch 9 while monitoring the voltage of capacitor bank 7 and the operating state of the ignition key for operating the ignition switch (both not shown) of the vehicle on which the auxiliary electric power supply for a vehicle is mounted. Controller 10 thus controls charge and discharge of capacitor bank 7. Capacitor bank 7, first switch 8, controller 10, and discharge resistance 11 compose an auxiliary electric power supply for a vehicle.

A description is made for the action of the charger/discharger for a vehicle according to the embodiment with the above-described makeup. First, the case where engine 1 is started when a sufficient amount of electricity is charged in battery 5 is described. When the ignition key (not shown) is turned to turn on starter relay 4, and starter relay 4 enters a conduction state, battery 5 supplies power to drive starter motor 3. By this process, engine 1 rotates, then continues running. To drive starter motor 3 when starting engine 1, battery 5 needs to supply a current of approximately 600 A.

Next, a description is made for the charge operation performed while engine 1 is running. Power generator 2 is driven in conjunction with the rotation of engine 1. Power generated by power generator 2 is charged in battery 5 as well as in capacitor bank 7. Braking energy generated when stopping the vehicle by applying brakes is as high as 200 A in maximum, thus battery 5 cannot charge all of it. Consequently, almost all the high braking energy is charged in capacitor bank 7 to be reused.

In capacitor bank 7, 5 balanced resistances with the same resistance value are parallel-connected to each parallel unit of electric double layer capacitors. Consequently, when capacitor bank 7 is charged, each parallel unit is applied with roughly the same voltage.

When restarting engine 1 after stopping idling, first switch 8 is connecting capacitor bank 7 directly to battery 5. As a result, energy in capacitor bank 7 charged as described above is supplied to starter motor 3, while being supplied to backup circuit 6 as backup energy in an emergency.

Capacitor bank 7, when used in this way, can supply sufficient power in a fully charged condition while the vehicle is non-operating. However, if the non-operating state continues under this condition, the electric double layer capacitors shorten their lives due to a heavy load placed. Under the circumstances, controller 10 controls first switch 8 to connect capacitor bank 7 to discharge resistance 11, causing capacitor bank 7 to discharge. This process causes each electric double layer capacitor to discharge, to reduce its storage amount, and to decrease the voltage of capacitor bank 7 to a given first voltage. This first voltage is a voltage at which the life of the capacitor is not shortened, where discharging to the first voltage suppresses the life deterioration of the capacitor. In this embodiment, controller 10 continues to connect first switch 8 to the discharge resistance 11 side until the voltage per one of electric double layer capacitors decreases to 1.5 V which is 60% of the rated voltage 2.5 V. In other words, controller 10 continues to connect first switch 8 to the discharge resistance 11 side until the voltage of capacitor bank 7 decreases to 10.5 V.

In capacitor bank 7, 5 balanced resistances with the same resistance value are parallel-connected to each parallel unit of electric double layer capacitors. Consequently, when capacitor bank 7 is discharged, the voltage of each parallel unit decreases at a roughly equal rate.

When the voltage of capacitor bank 7 decreases to the first voltage, controller 10 controls first switch 8 so as to connect the electric double layer capacitors to the battery 5 side (i.e. on state). In other words, controller 10 controls first switch 8 so as to connect capacitor bank 7 to the side of the I/O end linking to battery 5 when the voltage of capacitor bank 7 becomes 10.5 V.

While the vehicle is non-operating, and the voltage per one of electric double layer capacitors is 1.5 V and the voltage of capacitor bank 7 is 10.5 V, it is preferable that first switch 8 is in a neutral state. That is, it is preferable that controller 10 controls first switch 8 so as to disconnect capacitor bank 7 from the I/O end and discharge resistance 11 at the first voltage. In this state, a dark current is not supplied from capacitor bank 7 but only from battery 5 to an in-vehicle device. That is, each electric double layer capacitor of capacitor bank 7 enters a self-discharge state. In this case, when controller 10 detects that the ignition key has been operated so as to turn on the ignition switch, controller 10 controls first switch 8 so as to connect capacitor bank 7 to the I/O end linking to battery 5 before starter relay 4 enters a conduction state.

It is preferable the controller 10 controls second switch 9 as well. Hereinafter, a description is made for the operation in the case where controller 10 controls second switch 9 along with controlling first switch 8. Both first switch 8 and second switch 9 are on while the vehicle is operating. Controller 10 is monitoring the on/off state of the ignition switch (not shown) of the vehicle. When the vehicle is made non-operating, namely when the user turns the ignition key to turn off the ignition switch, controller 10 controls first switch 8 so as to connect capacitor bank 7 to discharge resistance 11, causing capacitor bank 7 to discharge. When the voltage per one of electric double layer capacitors becomes 1.5 V and the voltage of capacitor bank 7 becomes 10.5 V, controller 10 sets first switch 8 to a neutral state. After that or simultaneously, controller 10 sets second switch 9 to an off state. Second switch 9 is thus controlled only when the voltages of electric double layer capacitors forming capacitor bank 7 are balanced and additionally when the vehicle ignition switch is off.

When the vehicle enters a non-operating state, second switch 9 remains on so as to rapidly discharge fully charged energy until 1.5 V is reached, which is the first voltage set so that the life of the electric double layer capacitor will not be shortened. When the voltage per one of electric double layer capacitors becomes 1.5 V and first switch 8 enters a neutral state, second switch is turned off as well and each electric double layer capacitor enters a self-discharge state.

In this case, controller 10, after detecting the operation of the ignition key, turns on first switch 8 after or simultaneously with turning on second switch 9, before starter relay 4 enters a conduction state. In other words, controller 10 controls second switch 9 so as to connect each electric double layer capacitor to a balanced resistance, and then or simultaneously, controls first switch 8 so as to connect capacitor bank 7 to the I/O end linking to battery 5. Repeating such operation causes the voltage of each electric double layer capacitor forming capacitor bank 7 to be maintained at roughly 1.5 V, namely the first voltage.

Besides this process, controller 10 may control first switch 8 so as to connect the electric double layer capacitors to the battery 5 side when the voltage of capacitor bank 7 becomes a given second voltage. The second voltage is lower than the first voltage, and is the minimum voltage required to start engine 1. For example, the voltage per one of electric double layer capacitors has a threshold of 0.6 V which is 24% of the rated voltage 2.5 V. That is, controller 10 controls first switch 8 so as to connect capacitor bank 7 to the side of the I/O end linking to battery 5 when the voltage of capacitor bank 7 becomes 4.2 V.

It is preferable that controller 10 controls second switch 9 as well. Hereinafter, a description is made for the operation in the case where controller 10 controls second switch 9 along with controlling first switch 8. Both first switch 8 and second switch 9 are on while the vehicle is operating. When the vehicle is made non-operating, namely when the user turns the ignition key to turn off the ignition switch, controller 10 controls first switch 8 so as to connect capacitor bank 7 to discharge resistance 11, causing capacitor bank 7 to discharge. When the voltage per one of electric double layer capacitors becomes 1.5 V and the voltage of capacitor bank 7 becomes 10.5 V, controller 10 sets first switch 8 to a neutral state. After that or simultaneously, controller 10 sets second switch 9 to an off state.

When the vehicle enters a non-operating state, second switch 9 remains on so as to rapidly discharge fully charged energy until 1.5 V is reached, which is the first voltage set so that the life of the electric double layer capacitor will not be shortened. When the voltage per one of electric double layer capacitors becomes 1.5 V and first switch 8 enters a neutral state, the second switch is turned off as well and each electric double layer capacitor enters a self-discharge state.

When the voltage per one of electric double layer capacitors decreases to 0.6 V (i.e. the second voltage), controller 10 detects it and turns on first switch 8 after or simultaneously with turning on second switch 9, so as to charge the capacitors from battery 5 until the voltage of the capacitors becomes a given voltage of 1.5 V or higher. Repeating such operation causes the voltage of each electric double layer capacitor forming capacitor bank 7 to be maintained between 1.5 V (e.g. the first voltage) and 0.6 V (e.g. the second voltage).

As described above, controller 10 controls first switch 8 and second switch 9, and thus a heavy load is not placed on each electric double layer capacitor, resulting in suppressing the life deterioration. When the battery voltage drops when starting up the vehicle, series-connecting capacitor bank 7 to battery 5 allows energy in electric double layer capacitors to be supplied, thereby significantly improving the performance as a charger/discharger for a vehicle.

In the auxiliary electric power supply for a vehicle according to the embodiment, capacitor bank 7 has second switch 9; the I/O end of capacitor bank 7 has first switch 8; and controller 10 controls charge and discharge of each electric double layer capacitor, as described above. This makeup reduces a load on the electric double layer capacitors forming capacitor bank 7 and on battery 5, thereby prolonging their lives. Further, a load due to a dark current is unlikely to be placed on the capacitors, thereby improving the reliability in starting engine 1.

When capacitor bank 7 is connected directly to battery 5 to drive starter motor 3, the voltage can be raised to twice, thereby starting engine 1 reliably even for a small amount of electricity accumulated in battery 5.

In this embodiment, the description is made for capacitor bank 7 with what is called a 7-series 3-parallel composition, which is formed of 3 units parallel-connected, where a 14V unit is composed of 7 electric double layer capacitors series-connected. However the present invention is not limited to this composition. The same advantage is available even if the composition is changed according to application. The same is equally true of the balanced resistances forming capacitor bank 7.

The description is made for the case where a given first voltage, at which the life of electric double layer capacitors is not shortened, is 60% of the rated voltage, and where a given second voltage, which is the minimum voltage required for starting engine 1, is 24% of the rated voltage. However, the present invention is not limited to this voltage setting.

Second Exemplary Embodiment

Figure 2:
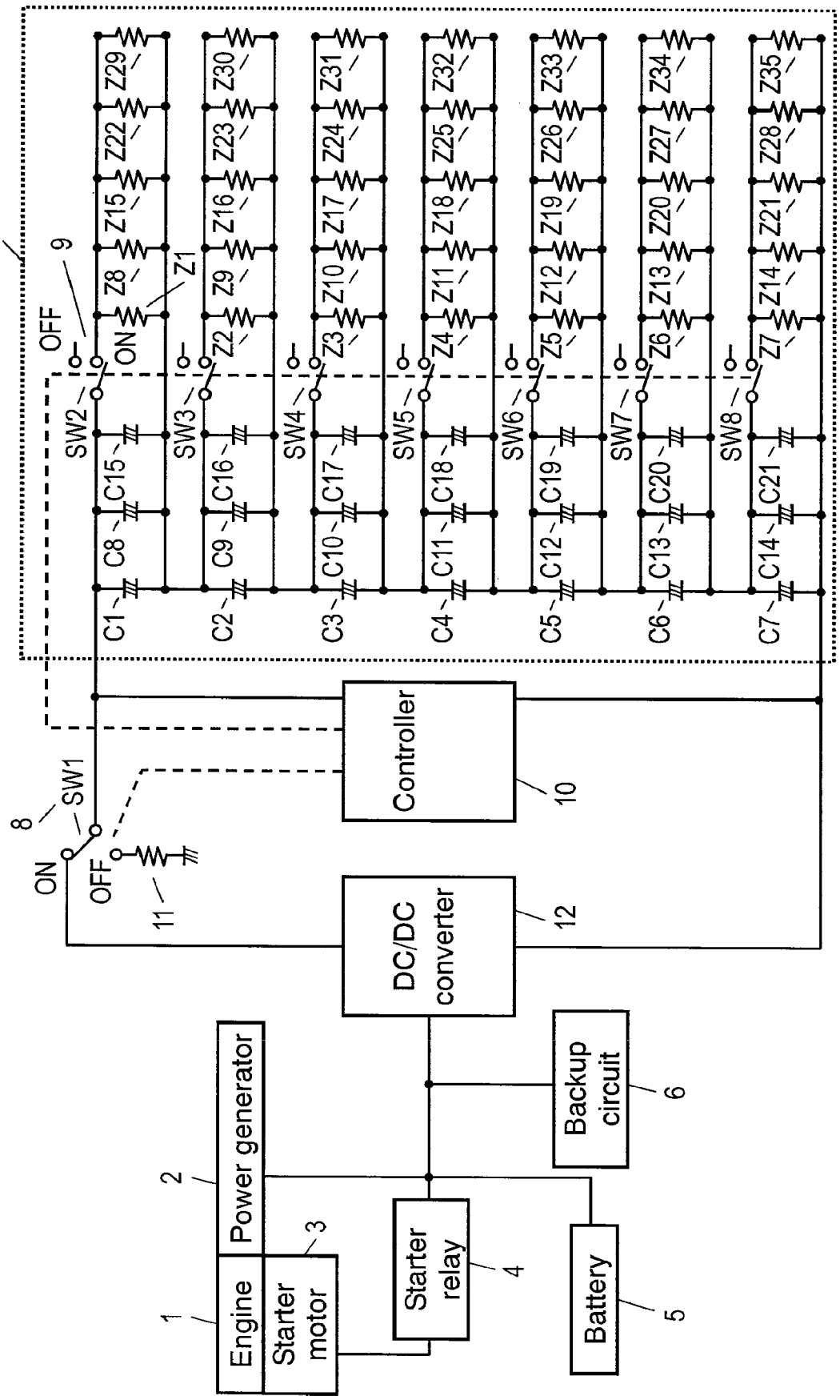
FIG. 2 is a block diagram illustrating makeup of a charger/discharger for a vehicle, according to a second exemplary embodiment of the present invention, in conjunction with a circuit diagram.
Figure 3:
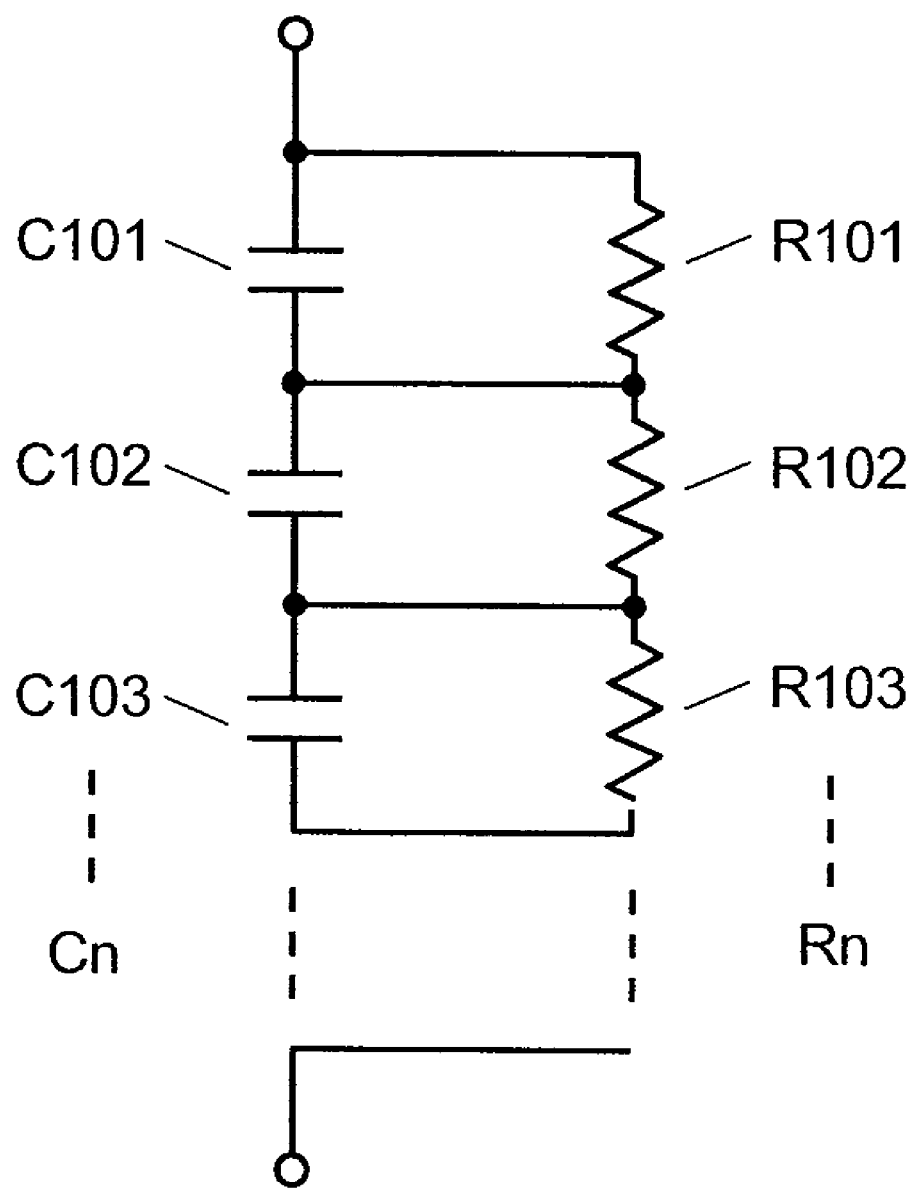
FIG. 3 is a circuit diagram illustrating a conventional capacitor charging circuit.

FIG. 2 is a block diagram illustrating makeup of a charger/discharger for a vehicle according to the second exemplary embodiment of the present invention, in conjunction with a circuit diagram. The present embodiment is different from the first one in that DC/DC converter 12 is provided between starter relay 4 and switch 8. That is, DC/DC converter 12 is provided between the I/O end of capacitor bank 7 and first switch 8, to raise the output voltage. The basic composition otherwise is the same as that in FIG. 1, and thus a same reference mark is given to what has the same makeup as that of the first embodiment, to omit detailed descriptions.

The power generated by generator 2 driven in conjunction with the rotation of engine 1 is charged in battery 5, as well as in capacitor bank 7 through DC/DC converter 12. When driving starter motor 3 uses the power accumulated in capacitor bank 7, the power from the electric double layer capacitors can be supplied with the voltage raised by DC/DC converter 12. Consequently, starter motor 3 is applied with the voltage of battery 5 and the raised voltage of the electric double layer capacitors together, thereby starting engine 1 reliably.

As described above, according to this embodiment, a heavy load is not placed on each electric double layer capacitor, in the same way as in the first embodiment, resulting in suppressing the life deterioration of the capacitors. Even when the voltage of battery 5 drops when starting up the vehicle, direct connection of capacitor bank 7 to battery 5 allows energy in electric double layer capacitors to be supplied. Further, raising the voltage of the electric double layer capacitors by DC/DC converter 12 enables engine 1 to be started reliably.

INDUSTRIAL APPLICABILITY

An auxiliary electric power supply for a vehicle according to the present invention reduces a load on the electric double layer capacitors and battery to lengthen their lives. Further, a load due to a dark current is unlikely to be placed on the electric double layer capacitors. A charger/discharger for a vehicle of the present invention including this auxiliary electric power supply for a vehicle, is useful for hybrid cars and automobiles with stop-idling function.

The invention claimed is:

1. An auxiliary electric power supply for a vehicle, the vehicle comprising an ignition switch and an ignition key operating the ignition switch, the auxiliary electric power supply comprising:
   a first switch electrically connected to an I/O end;
   a capacitor bank connected to the first switch, the capacitor bank having:
      a plurality of series-connected electric double layer capacitors; and
      a plurality of balanced resistances, each resistance being parallel-connected to each electric double layer capacitor, and having substantively a same resistance value;
   a discharge resistance connected to the first switch; and
   a controller controlling the first switch while monitoring voltage of the capacitor bank and an operating state of the ignition key of the vehicle including the auxiliary electric power supply,
   wherein the controller controls the first switch so as to connect the capacitor bank to the discharge resistance when the ignition switch of the vehicle is turned off, to discharge the capacitor bank and to decrease the voltage of the capacitor bank to a first voltage, at which life deterioration of the electric double layer capacitors is suppressed.

2. The auxiliary electric power supply for a vehicle according to claim 1,
   wherein the controller controls the first switch so as to connect the capacitor bank to the I/O end when the voltage of the capacitor bank becomes the first voltage.

3. The auxiliary electric power supply for a vehicle according to claim 1,
   wherein the controller controls the first switch so as to disconnect the capacitor bank from the I/O end and the discharge resistance when the voltage of the capacitor bank becomes the first voltage, and so as to connect the capacitor bank to the I/O end when the ignition key is operated so as to turn on the ignition switch.

4. The auxiliary electric power supply for a vehicle according to claim 3,
   wherein the capacitor bank further includes a second switch provided between each of the electric double layer capacitors and corresponding each of the balanced resistances, and
   wherein the controller controls the second switch so as to disconnect the each electric double layer capacitor from the each balanced resistance immediately after or while the first switch disconnects the capacitor bank from the I/O end, and controls the second switch so as to connect the each electric double layer capacitor to the each balanced resistance immediately after or while the first switch connects the capacitor bank to the I/O end.

5. The auxiliary electric power supply for a vehicle according to claim 1,
   wherein the controller controls the first switch so as to disconnect the capacitor bank from the I/O end and the discharge resistance when the voltage of the capacitor bank becomes the first voltage, and so as to connect the capacitor bank to the I/O end when the voltage of the capacitor bank becomes a second voltage, which is lower than the first voltage.

6. The auxiliary electric power supply for a vehicle according to claim 5,
   wherein the capacitor bank further includes a second switch provided between each of the electric double layer capacitors and corresponding each of the balanced resistances, and
   wherein the controller controls the second switch so as to disconnect the each electric double layer capacitor from the each balanced resistance immediately after or while the first switch disconnects the capacitor bank from the I/O end, and to connect the each electric double layer capacitor to the each balanced resistance immediately before the first switch connects the capacitor bank to the I/O end.

7. The auxiliary electric power supply for a vehicle according to claim 1, further comprising a DC/DC converter connected between the first switch and the I/O end.

8. A charger/discharger for a vehicle, comprising:
the auxiliary electric power supply for a vehicle, according to claim 1;
a battery electrically connected to the I/O end of the auxiliary electric power supply; and
a power generator electrically connected to the I/O end of the auxiliary electric power supply and to the battery.

* * * * *